INVENTOR
DONALD F. FOREMAN
BY William N. Barret Jr.
ATTORNEY

Sept. 10, 1963 D. F. FOREMAN 3,103,580

SELECTIVE DATA SHIFT REGISTER

Filed Oct. 29, 1959 5 Sheets-Sheet 4

United States Patent Office 3,103,580
Patented Sept. 10, 1963

3,103,580
SELECTIVE DATA SHIFT REGISTER
Donald F. Foreman, Vestal, N.Y., assignor to International Business Machines Corporation, New York, N.Y., a corporation of New York
Filed Oct. 29, 1959, Ser. No. 849,666
2 Claims. (Cl. 235—159)

Figure 1:
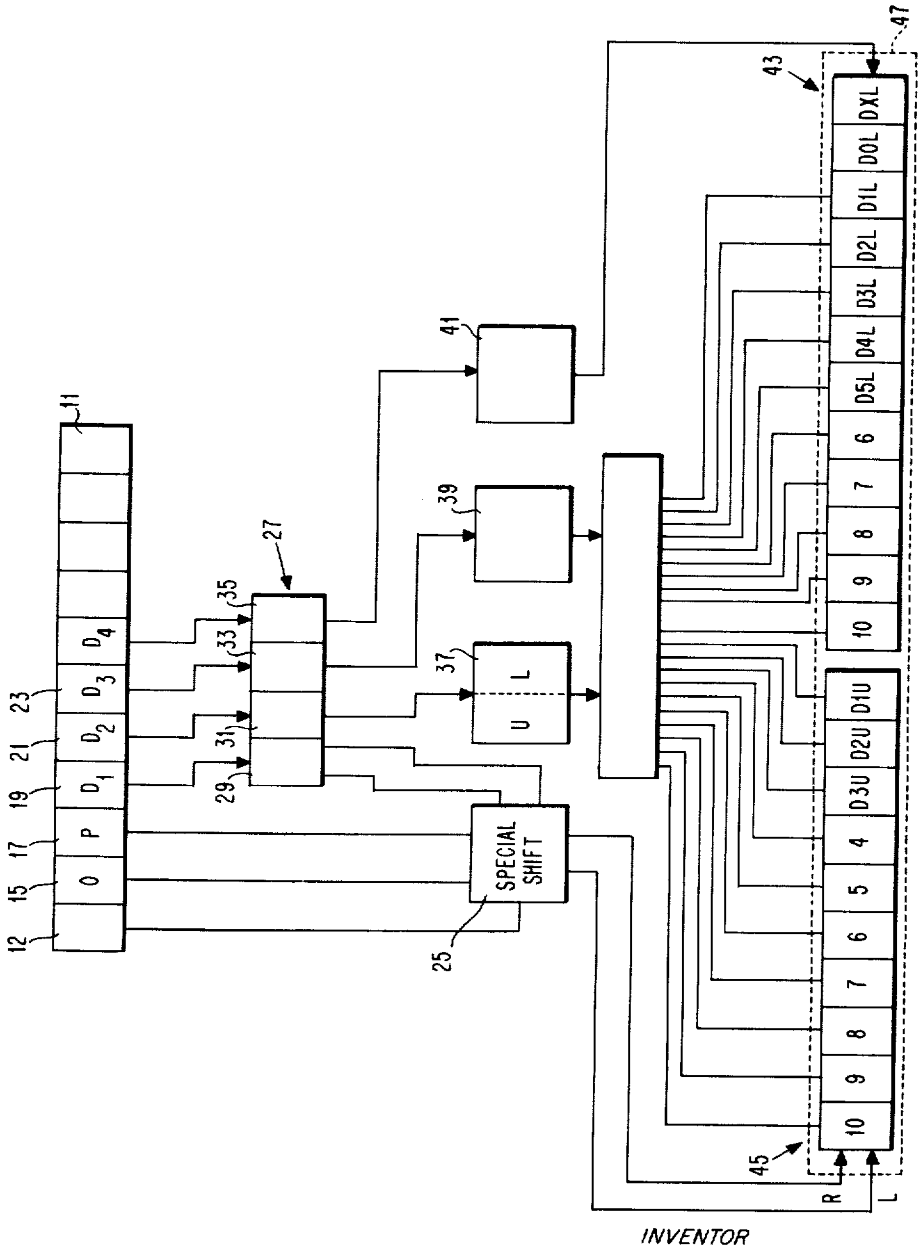

The present invention relates to a shift register and, in particular, to a shift register in which a particular digit position may be selected to shift only desired portions of a word contained in the register. The present invention is an improvement over the shift register shown in application Serial No. 544,520, Patent No. 2,959,351, to Hamilton et al. In that application, a shift register is disclosed which, on command, shifts a word contained therein right or left a preselected number of digit places.

The present invention utilizes the shift register shown in the above application and provides apparatus for selecting a digit position around which a shift is to take place. For example, a word stored in the shift register as follows and using only ten places in the illustration:

X X X X X X X X X X
10 9 8 7 6 5 4 3 2 1 could be shifted right or left three places in prior-known apparatus (and zeros filled in) as follows:

| | | | | | | | | | | |
|---|---|---|---|---|---|---|---|---|---|---|
| | 0 | 0 | 0 | X | X | X | X | X | X | X |
| Right Shift | 10 | 9 | 8 | 7 | 6 | 5 | 4 | 3 | 2 | 1 |
| | X | X | X | X | X | X | X | 0 | 0 | 0 |
| Left Shift | 10 | 9 | 8 | 7 | 6 | 5 | 4 | 3 | 2 | 1 |

This allows for the opening up of a data word and finds great utility in editing operations in which the word is to be spaced apart to signify demarcations such as quantity, price, etc. Other editing may be in the form of inserting decimal points, commas, dollar signs, etc. In the usual instance, data is processed in a machine without regard to special symbols and the editing done by spacing the data on the printer.

The present invention provides for editing by use of the special shift controls as follows.

If the number stored in the accumulator is:

0 0 8 5 6 4 3 7 0 0
10 9 8 7 6 5 4 3 2 1 and it is intended that the number printed out be in the form:

$8,564.37 the number could be shifted right one place at digit 4 location to obtain:

0 0 8 5 6 4 0 3 7 0
10 9 8 7 6 5 4 3 2 1 and shifted left one place at digit 8 location to obtain:

0 8 0 5 6 4 0 3 7 0
10 9 8 7 6 5 4 3 2 1

At this time the decimal point and comma could be added singly to the word in the register or in parallel as follows:

$ 0 , 0 0 0 . 0 0 0
10 9 8 7 6 5 4 3 2 1 to obtain:

$ 8 , 5 6 4 . 3 7 0
10 9 8 7 6 5 4 3 2 1 which is the result desired.

It is therefore an object of this invention to provide a new and improved shift register.

It is a further object of this invention to provide a shift register in which shifting is accomplished around a preselected digit position in the register.

It is another and further object of this invention to provide a shift register for editing operations.

Another and further object of this invention is to provide an editing operation in a machine by controlling the operation of a shift register already contained in said machine.

The foregoing and other objects, features and advantages of the invention will be apparent from the following more particular description of a preferred embodiment of the invention, as illustrated in the accompanying drawings.

In the drawings:

FIG. 1 is a schematic illustration of the invention.

Figure 2:
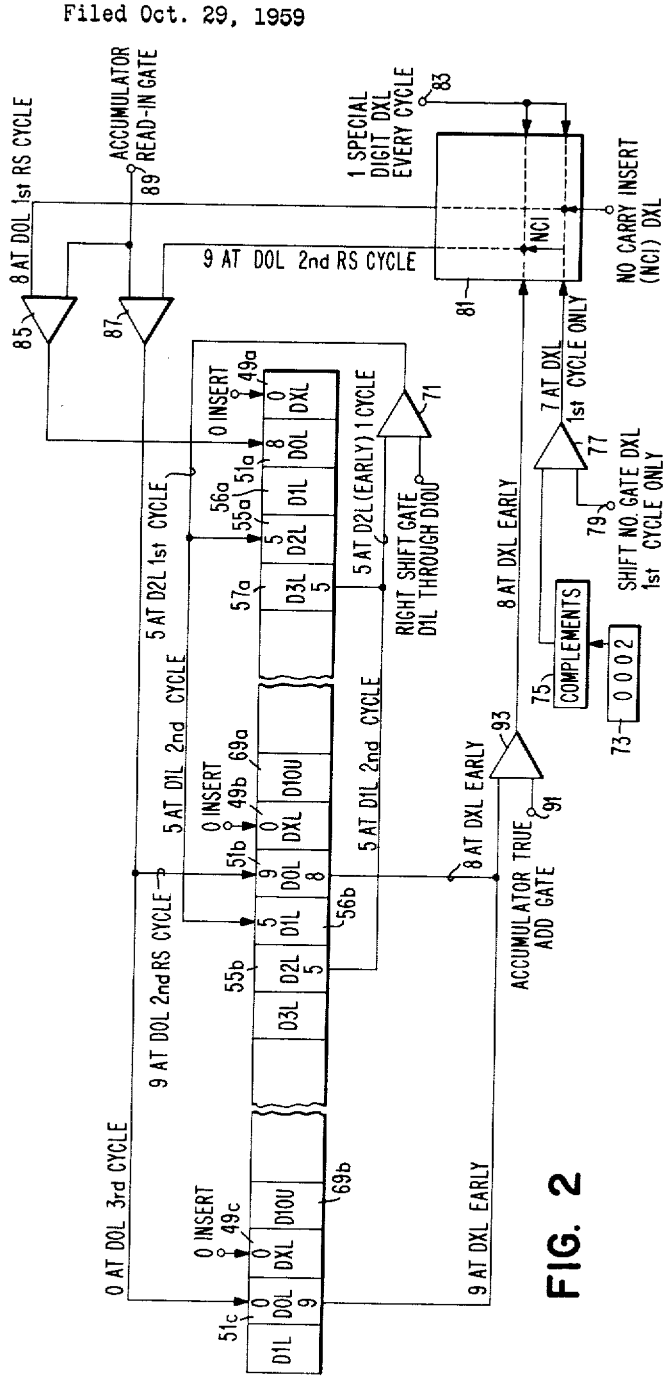
Figure 2A:
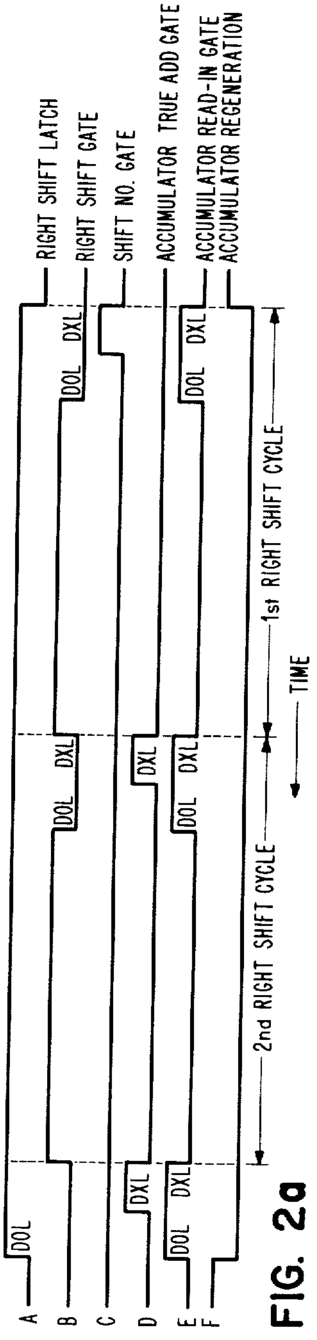

FIGS. 2 and 2*a* are schematic illustrations of a portion of the apparatus used in the present invention and its operation prior to the present invention.

Figure 3:
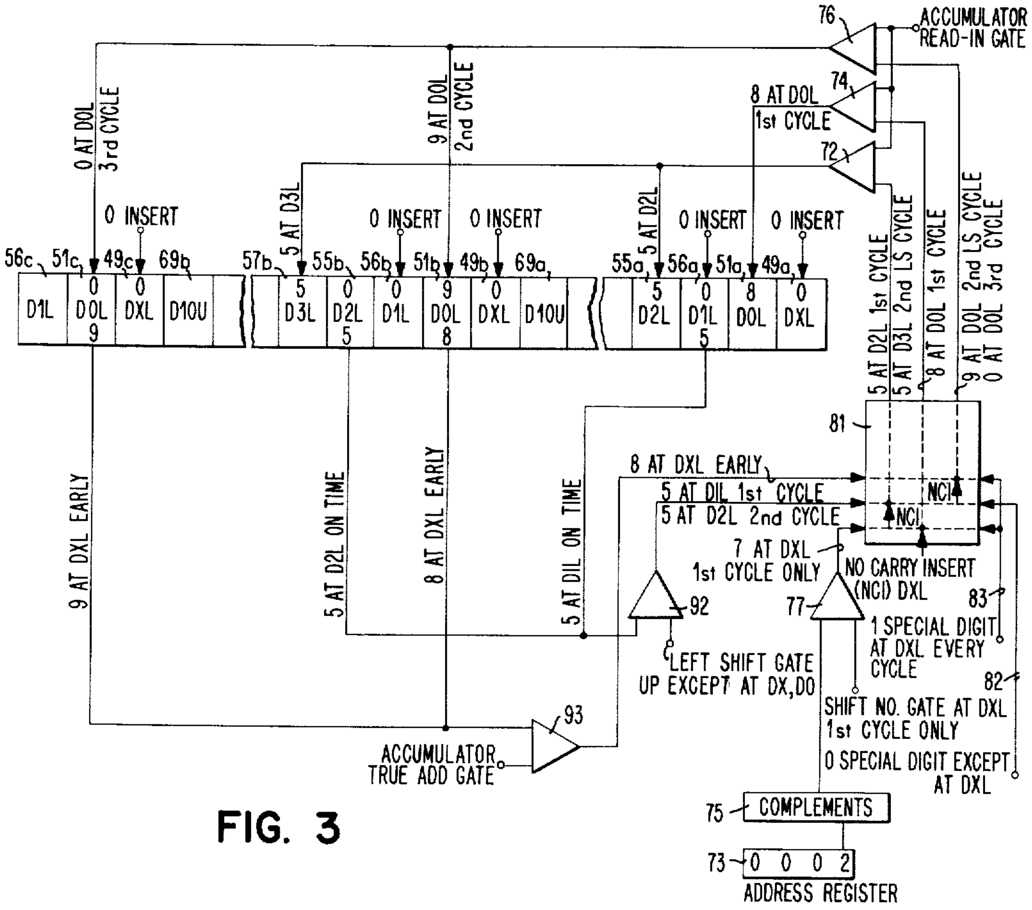
Figure 3A:
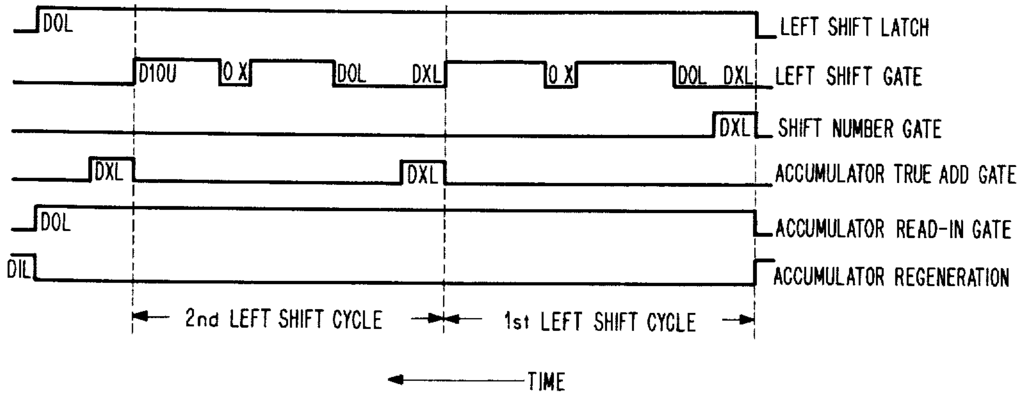

FIGS. 3 and 3*a* are schematic illustrations of a portion of the apparatus used in the present invention and its operation prior to the present invention.

Figure 4:
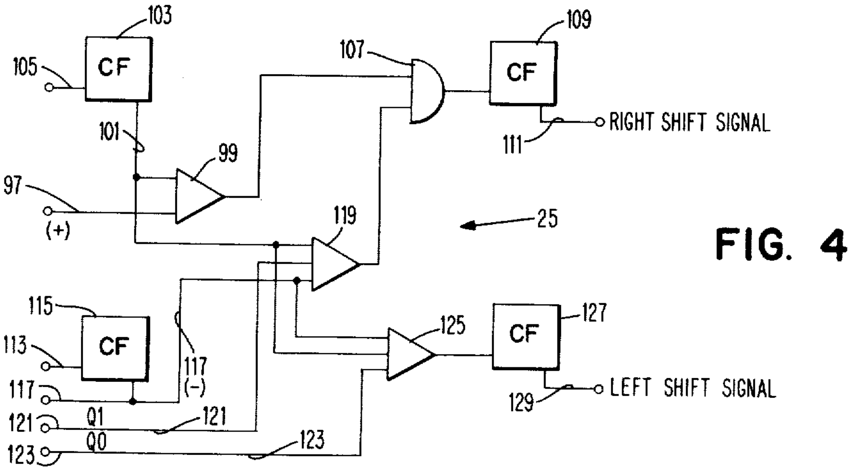
Figure 5A:
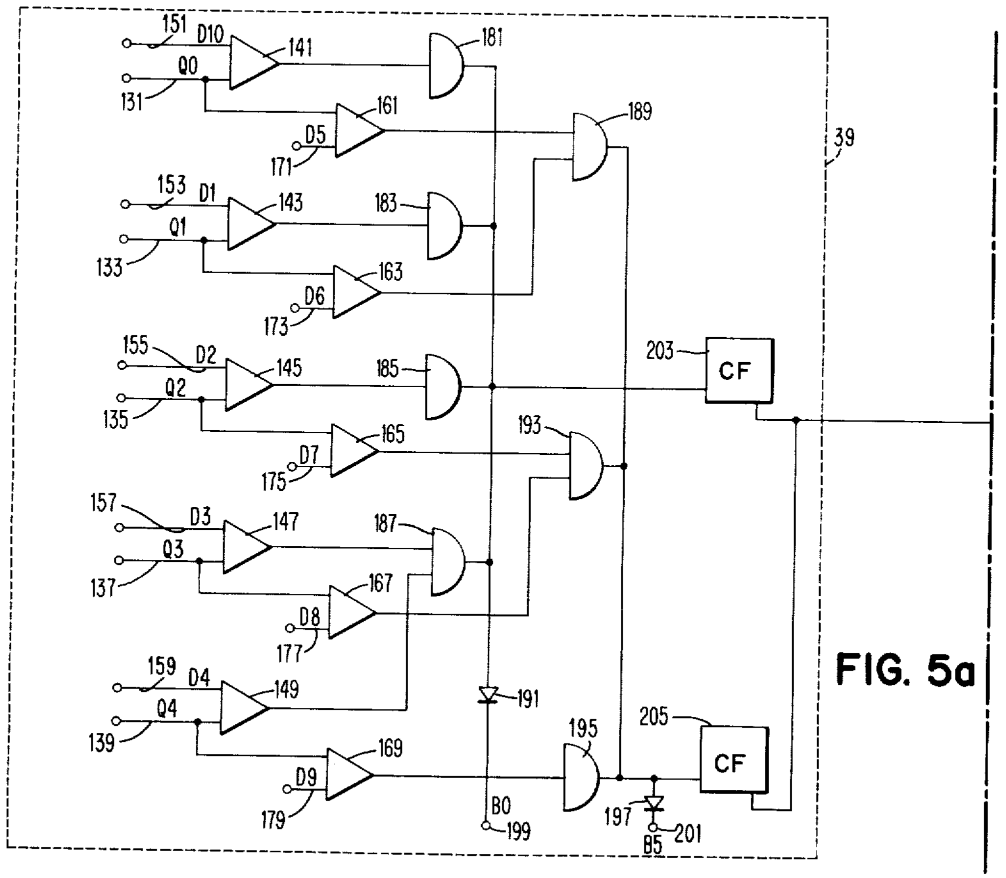
Figure 5B:
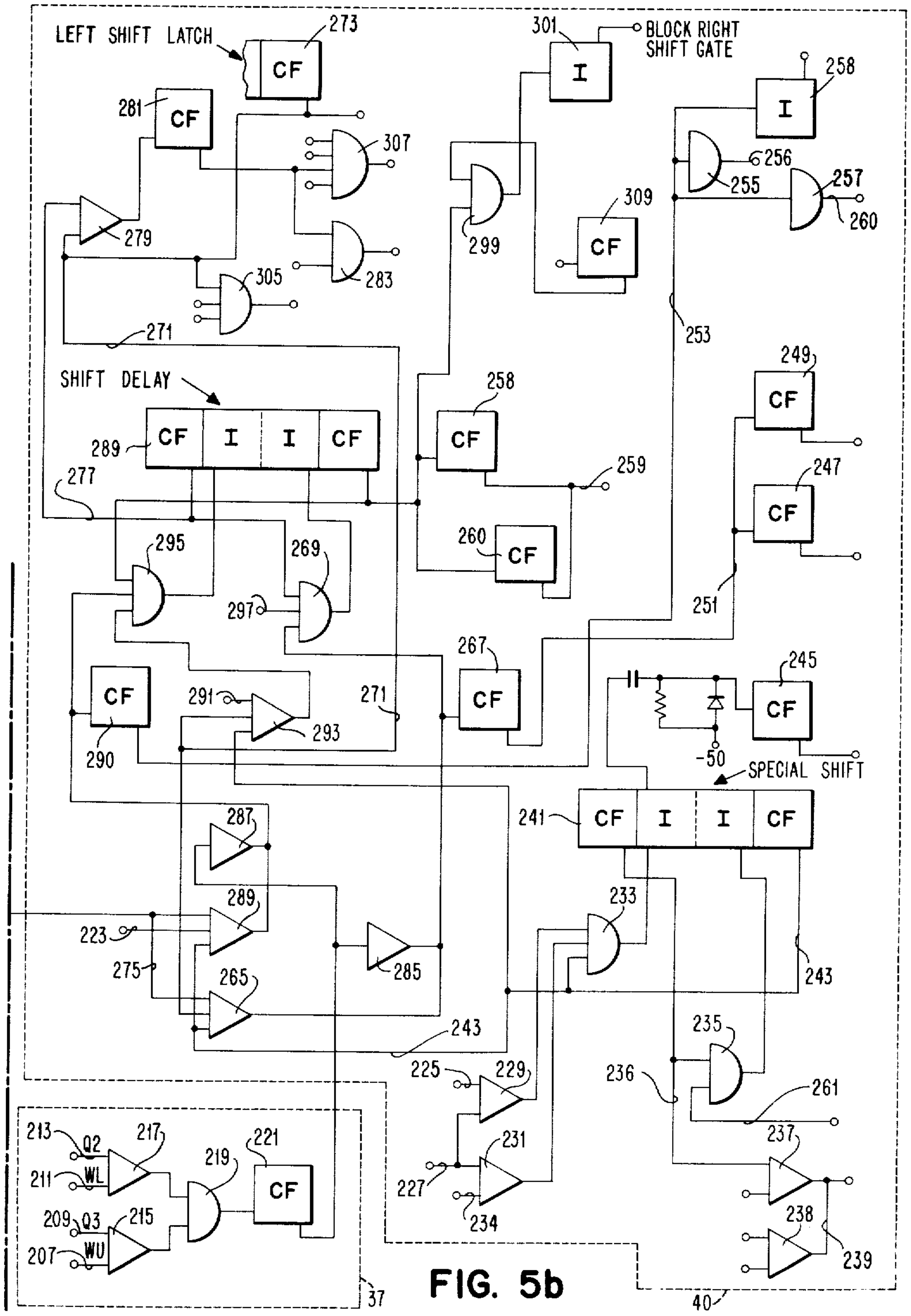

FIGS. 4, 5*a* and 5*b* are the detailed circuit of a portion of the present invention.

In FIG. 1, a program register 11, forming part of a machine in which the shift register utilized in the present invention is contained, contains a number of storage locations for digits indicative of the operation which the machine is then to execute. Each digit location consists of seven static registering devices for the seven bits of the biquinary code. This code consists of two binary bit positions and five quinary bit positions, with the binary bit position having a decimal equivalent of zero and five represented by the presence of a "1" in the B0 or B5 position respectively. The "1" in this case indicates that the device has been set to a predetermined state. The quinary bit positions, Q0, Q1, Q2, Q3, Q4, represent the decimal number 0–4 respectively when a "1" is placed in a given position. The code then has two bits for each digit and by adding the decimal equivalent of each bit, the number itself will be recognized.

While the register 11 has eleven positions, the present invention is concerned with only the first seven. Digit positions 15 and 17 contain the operation code, or more commonly the OP code, and designate the operation which the machine is to execute. In the present instance, for example, the shift code is —30. The "—" is recognized by the machine in digit position 12.

A shift circuit 25 recognizes the predetermined number contained in digit places 15 and 17 as a shift instruction.

An address register 27 contains four digit positions for the four digits contained in the operation register 11, which are shifted down to this register 27 when the operation is to be executed. In digit position 29, a "0" or "1" is set to indicate a left or right shift respectively. In digit position 31, a "2" or "3" is set to indicate whether the digit position with which the shift is concerned is in the lower or upper accumulator of the shift register 43 or 45. Digit position 33 has contained therein a number from 1–9 and 0 which indicate the digit positions 1–10 respectively of either the upper or lower accumulator. This is the demarcation point from which the shift will begin or terminate. Digit position 27 contains a number 1–9 and 0 which indicate the number of digit positions which the number stored in the shift register is moved. The units 37 and 39 are responsive to the digits contained in positions 31 and 33 to provide the required control signals to perform the indicated operations. The unit 41 stores the complement of the number in position 35 and for each digit shift in the shift register, the digit stored in unit 41 is incremented by one. When a carry occurs, the operation will be terminated. The unit 40 is the selection circuit for the particular digit position.

The shift register 47 in the machine in which it is a unit is used for many operations and is termed an accumulator. The register is divided into an upper accumulator 45 and a lower accumulator 43. The lower accumulator has twelve digit positions DX, D0, D1–D10; the upper accumulator has digit positions D1–D10 only. Digit positions 49 and 51 which contain DX and D0 do not ordinarily contain arithmetically significant digits. In the machine as constructed, the timing consists of timing digits DX, D0 and D1–D10 pulses occuring successively which are related to the digit positions in register in a manner to appear subsequently.

Before proceeding with a detailed description of the present invention, schematic illustrations of the shift register prior to the present invention will be explained in order to properly orient the apparatus of the present invention. In FIG. 2 and FIG. 2*a*, a schematic illustration of a number stored in the register is being shifted two digits to the right. To simplify matters, only one accumulator 43, i.e., the lower, is shown with a single position D10U of the upper accumulator 45. In order to further simplify the operation, only one digit will be cycled through the machine although it should be understood that every digit standing in the register will be moved in a similar manner. This digit is shown as "5" in digit position 55. Time is shown going from right to left and the successive condition of register 43 is shown as coinciding with the timing signals A–F of FIG. 2*a*.

When the right shift latch timing pulse, curve A, goes up, the right shift gate 71, is enabled as shown by curve B, from times D1L through D10U and each digit position is read out and read back as shown. In digit position **57*a*, the number 5 will be sensed at digit 2 time (early) and transferred through gate 71 to digit position 55*a*** to effect a shift of one digit place.

The accumulator or shift registers here utilized have each digit position read out successively and conveyed back to the digit position corresponding to the related digit pulse. Each digit position is therefore sensed successively and a transfer made to that digit position enabled by a particular digit pulse. In order to effect the right digit shift, the digit position succeeding the one into which the number contained in this position is to be shifted must be read out prior to the actual operation of the preceding digit position into which the number is to be read. These are called early pulses.

On the next cycle, the digit in position D2L, now labeled **55*b*, is transferred to D1L, labeled 56*b***, and the shift to the right is terminated. It is, of course, to be remembered that the various digit positions not mentioned could, and probably would, contain other digits to be shifted along with "5." This shift, as mentioned previously, is carried by a successive chaining of the number in one digit position to the position succeeding the same. This is particularly shown in the above-mentioned application.

The required number of places to be shifted is shown in a program register 73. When the shift number gate on line 71 curve C, occurs at DXL time in the first cycle, the digit 2 is gated in complementary form through translator 75 by means of gate 77 to the adder 81. A "1" is added to this number, input 83, and the resulting number "8" entered into digit position **51*a* which is the D0L position. The AND circuits 85 and 87 are enabled by an accumulator read-in gate on line 89**, see curve E, FIG. 2*b*. The loss of a digit position is caused by the delay in the adder 81.

On the occurrence of an accumulator true add gate on AND circuit 93 at DXL time, curve D, at the beginning of the second cycle, the digit "8" in **51*a*, now labeled 51*b*, is recirculated through the adder 81** and a "1" added thereto and a "9" inserted at D0L time. On the beginning of a third cycle, the same sequence of events occurs, but this time the adder detects a carry, "9" plus "1," and the shift operation is terminated.

In FIG. 3*a* and FIG. 3*b*, a left shift operation is shown by which a number stored in the register may be moved to the left. This is accomplished by sensing the digits on time and by virtue of a one digit delay in adder 81 will be introduced into the register at the next succeeding position just subsequent to the time that the digit formerly contained therein is read out to the adder.

While the shift register and the various controls have not been recited in great detail since applicant relies on the above-mentioned docket to complete the disclosure of his invention, it is believed to be sufficient to allow one to understand the manner of operation of this particular type of register without recourse to the particulars of that application.

The present invention incorporates the above described shift register and all its various controls with means for determining the digit position in the shift register about which the shifting is to occur. In describing the invention in detail, only those details different from the shift register in the above application will be described.

In describing the detail circuit of the present invention, reference will be made to the point at which various lines originate and terminate. Further in parenthetical expression, these various lines will also be connected at points in the above-referred to application so that reference thereto will yield the detailed description of the operation of these components.

As mentioned previously, the operation code for the particular shift now under consideration is —30. However, in those cases where the operation code is +30, provision must be made to effect an ordinary shift. This is accomplished, FIG. 4, by a plus signal from the program register on line 97 which is coupled to an AND circuit 99 which also has connected thereto on line 101 an indication of a code 30 coupled through cathode follower 103 in response to a signal on line 105. The program register 11 and address register 27 are shown in detail in the above application. However, a minus or plus indication in the program register is not shown but would include another stage for the biquinary representation of a plus or minus. When the and circuit 99 is conditioned, the raised voltage will be coupled through OR circuit 107, cathode follower 109 to a line 111 which is the right shift signal (FIG. 78*b* as marked; CF 103 is already there; connect line 101 to output and remove original output to right shift signal line). When the program register contains a minus indication, the line 113 will be up and cathode follower 115 will couple the raised signal to line 117 and AND gate 119 on which the code 30 signal on line 101 is also connected. Lines 121 and 123 (FIG. 75*c*) are connected to the thousands position of the program register, which it will be remembered contain a "0" or "1" in dependence on whether a left shift or a right shift is to be made. Line 121 is an indication of a "1" and is the Q1 line while line 123 is a "0" and is the Q0 line. In this particular case it is not necessary to sense more than two bits since the condition is either "0" or "1." If the line 121 is up, the AND gate 119 will be conditioned and the line 111 will have a raised output thereon by virtue of the signal coupled through OR circuit 107 and cathode follower 109. If the digit standing in the thousands position is "0" as evidenced by a raised voltage on line 123, the AND circuit 125 having connected thereto code 30 signal on line 101 and minus signal on line 117 will have a raised output to condition cathode follower 127 and provide a left shift signal on line 129 (FIG. 78*b*).

In the tens position of the address register, it will be remembered that a digit 1–9 or 0 will be stored in the biquinary form to indicate the digit position at which the shift will occur. In FIG. 5*a*, the lines 131, 133, 135, 137 and 139 (FIG. 75*d*) are connected to these digit registers to sense the presence of a bit while the lines 199 and 201 (FIG. 75*d*) sense the binary bits, B0 and B5, respectively. In order to translate the number standing in the address register into a time position, the static indication is converted to a time pulse by means of the AND gates 141 through 149 and 161 through 169 in cooperation with two AND circuits 191 and 197. Connected to each quinary line, for instance line 133, is an AND circuit 143 and 163. AND circuit 143 has a line 153 connected thereto on which a timing pulse D1 or digit 1 pulse is connected when the digit 1 pulse is present in the apparatus. The AND circuit 163 has a line 173 connected thereto on which a digit 6 pulse is connected so that if there is a quinary bit on Q1 on line 133, there will be an output from AND gate 143 or 163 at D1 time and D6 time which will be connected to the OR circuits 183 and 189 respectively. In order to determine, however, whether the quinary bit forms decimal 1 or a decimal 6, the presence of a binary bit must be sensed on line 199 and line 201.

Diode 191 is a voltage setting device and provides for a transmission of an indication from OR circuits 181 through 187 to cathode follower 203 when the B0 line has a raised voltage. As it will be remembered, when the B0 line is up, the digits from 0 to 4 will be indicated. When, however, the B5 line is up, 201, the diode 197 will have a raised bias and a signal from OR circuits 189, 193 and 195 will be coupled to cathode follower 205 to indicate a decimal number from 5 to 9 depending on the time in which the timing digit occurs. As it will be remembered, the shift register is timed so that the digits occur in accordance with a predetermined pattern D1 through D10. When a pulse is generated through cathode follower 203–205, it will be in time with the pulse on line 151 through 159 or 171 through 179, which caused the AND circuit to conduct in the original instance. The lines 151 has connected thereto the digit 10 pulse or zero while lines 153 through 159 have the digit timing pulses D1 through D4 connected thereto. Lines 171 through 179 have connected thereto the timing pulses D5 through D9. Therefore with the aid of the quinary bit position, the indication stored in the tens position of the address register will be translated into a decimal indication in time. As mentioned previously, there will be only one pulse but it will occur at the proper time to indicate its significance. These digit pulses originate from FIGS. 78*a* and 78*d* of the above-mentioned application.

The hundreds position of the address register has connected therefrom the Q2 line 213 (FIG. 75*e*) and the Q3 line 209 (FIG. 75*e*) which as it will be remembered, indicate a "2" or a "3," where the "2" represents a lower accumulator and the "3" represents the upper accumulator so that no other lines are needed to signify which portion of the accumulator the digit from the tens position is to be related. The lines 207 and 211 are the timing pulses for the upper accumulator and the lower accumulator and are derived from the apparatus of the machine itself. AND circuits 215 and 217 sense the occurrence of the Q3 pulse on line 209 or the Q2 pulse on line 213 and couple the same through an OR circuit 219, then cathode follower 221 to the proper control circuit. These AND circuits provide an enabling pulse during the time that the lower accumulator or the upper accumulator is being shifted and enables the various AND gates to be described subsequently.

Other control signals will be enumerated now which originate from the machine proper and will be tied in at a later time to the control circuit. On line 223 is a right shift on signal (FIG. 85*a*). The line 225 is the right shift signal (FIG. 85*f*) which is also provided from a different position in the machine. The line 227 indicates the program register minus and when coupled to the AND gate 229 with the right shift signal on line 225, provides a signal through OR circuit 233 to set the latch 241 to indicate that there is a special shift by virtue of the raised output on line 243. It is noted that the left shift signal on line 233 (FIG. 85*f*) will, through the AND circuit 231 and the minus signal on line 227, also set the special shift latch 241. The latch circuit 241 is reset through an OR circuit 235 by means of a signal on line 261 which is called the carry stop (FIG. 85*g*) which originates from the machine to instruct the machine that a carry has been generated and that the special shifts should be turned off. The normal machine restart is blocked by means of a signal on line 236 from the latch circuit 241 to inhibit the signal on 239, arithmetic restart (FIG. 85*d*). To restart the machine and determine the next operation, a signal is provided by latch 241 going off through the A.C. coupled cathode follower 245.

When a shift right or left is made from a predetermined digit position, the positions that are left vacant between the shifted portions of the number must have zeros inserted therein. This is accomplished for a left shift by means of a signal on line 251 to the cathode followers 249 (no carry insert FIG. 85*e*) and 247 (zero insert, 85*e*, from 939) which are connected into the machine proper in order to provide the necessary zero filling operations. On a right shift zero insert, the line 253 will be up and coupled through the OR circuit 255 to a line 256 which turns on the B0 line (FIG. 64*c*, input to B0 latch) while a signal to the OR circuit 257 brings up the Q0 line (FIG. 64*c*, input to Q0 latch) 260 to provide a B0 and Q0 at the necessary digit locations. The signal to inverter 258 is utilized for control purposes in the machine. This is connected as a disabling circuit for the cathode followers, FIG. 64, which are connected to the input of the early latches except the B0 and Q0 latches to provide for zero insertion. Line 259 is the accumulator regeneration line (FIG. 64*a*, to output of CF) and is also used as a special control for the machine operation.

In the operation of the machine, a shift left will be first discussed and the illustration of a shift left in FIG. 3 utilizing the whole apparatus contained in the machine will be referred to in order to more particularly illustrate the manner in which the present invention operates. While the illustration in FIG. 3 shows a 5 in the D1L position or the first position of the lower accumulator, which in essence is no different than an ordinary shift left, it will be made clear how the particular invention works using any digit position whether in the upper or lower accumulator. When the special shift line 243 goes up (output of latch 241), the AND circuit 265 is conditioned by the signal on this line as well as by a signal on line 271 which is connected from a left shift latch 273 (part of machine, labeled 1031, FIG. 85*b*) which was turned on when the left shift signal on line 129 was generated. The shift delay latch 289 is turned on by a left shift at the early digit "1" time by signal on line 291 (FIG. 78*f*, right side of AND 884) which is connected to an AND circuit 293 which also has connected thereto the special shift line 243 and the left shift signal on line 271. This will be connected through the OR circuit 295 which will turn the shift delay latch on. As mentioned previously, if the shift delay latch is on, then there will be no raised output on line 277 and no left shift until the shift delay latch is turned off. When the output on line 275 indicates that the proper digit pulse has occurred, appears at AND circuit 265, the AND circuit provides a raised voltage pulse to OR circuit 269 to turn off the shift delay latch 289 which by means of an output 277 indicates that the shift delay is off. AND circuit 279 will then be conditioned by means of a pulse on the line 277 and the left shift on latch on line 271 provides a pulse for cathode follower 281 to the left shift OR circuit 283 (part of machine, OR 1098, FIG. 85*d*) which starts the shifting process shown in FIG. 3*a*. In the particular case mentioned, the shift would have started at digit one time so that the events which occur in FIG. 3 would be substantially as shown here. In the event, however, that the digit had occurred in the particular accumulator, upper or lower, then the signal would not have been generated through the OR circuit 283 until that particular timing pulse had occurred so that the digits prior to that would not be disturbed. It is noted that the hundreds position of the address register coupled to the circuit by AND circuits 215 and 217 control the AND circuits 285 and 287 which when there is no enabling pulse present for the particular word time will not allow the AND circuits 265 or 289 to generate a pulse even when properly conditioned by the other factors.

In the right shifting operation and using the illustration as shown in FIG. 2*a*, the shifting procedure starts out in the ordinary manner. This is accomplished by signal on line 297 which is the early DXL digit time pulse which through OR circuit 269 turns the shift delay latch off and provides a lowered output to OR circuit 299 which in turn through inverter 301 provides a raised output and allows the right shift gate to operate and the digit stored in the shift register to be shifted right. When the proper digit place at which the shifting is to be terminated is reached, the output from cathode followers 203 or 205 goes up and conditions AND circuit 289 and by the raised output therefrom, the OR circuit 295 is coupled as its output coupled to the shift delay latch 289 to turn the latch on and therefore raise the voltage level at the output of the latch 289 and to drop the output of the inverter 301 and terminate the right shift.

The cycling is repeated as many times as necessary in accordance with the apparatus shown in FIGS. 2 and 3 in which the complement of the number of shifts desired is entered into the adder. When the overflow condition does occur, the signal on line 261 will be raised and the special shift latch 241 will be turned off and operations will cease and the machine will go on to the next operation.

Necessary changes in the various connections in the machine shown in the above application are as follows:

The OR circuit 1048 (shown as 307 here), FIG. 85*h*, must have the original second input from "Left Shift ON" line removed and the connection made as shown.

In FIG. 85*h*, the "Left Shift ON" line from OR 1061 must be removed and the output of latch 1031 connected thereto. This is OR circuit 305 of the present application.

In FIG. 85*d*, the "Left Shift ON" line from OR 1098 must be removed and the output of cathode follower 281 of the present application connected thereto. OR circuit 1098 is OR 283 in the present application.

Inverter 301 of the present application is shown in FIG. 85*f* as the inverter fed by an OR circuit which feeds into a cathode follower. The original connections to this inverter should be removed.

While the present invention has been illustrated in one embodiment as a single digit successive movement per cycle register, it is believed to be obvious that the invention in its broad aspects relates to other apparatus in which the movement of digits is controlled in a different manner.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A shift register comprising a plurality of digit storage locations capable of storing representations of digits of a data word, control register means for controlling the direction of shift, means for sensing successive digit positions of said shift register in a first direction, shifting means responsive to said control register means for shifting successive digit representations in said digit positions in a first or second direction, means for manifesting an indication of a digit position in said shift register, means responsive to said manifesting means for disabling said shifting means when said shifting is in a second direction and said selected digit position is sensed and means for enabling said shifting means when said shifting is in a first direction and said selected digit position is sensed.

2. The apparatus of claim 1 including means responsive to the sensing of said first digit position for disabling said shift when shift is in a first direction.

References Cited in the file of this patent

UNITED STATES PATENTS

| | | |
|---|---|---|
| 2,700,502 | Hamilton et al. | Jan. 25, 1955 |
| 2,947,478 | Lentz et al. | Aug. 2, 1960 |
| 2,969,913 | Cherin et al. | Jan. 31, 1961 |